US006777637B2

(12) United States Patent
Nakayama et al.

(10) Patent No.: US 6,777,637 B2
(45) Date of Patent: Aug. 17, 2004

(54) SHARPENING METHOD OF NANOTUBES

(75) Inventors: Yoshikazu Nakayama, 9-404, 14-2, Korigaoka 1-chome, Hirakata-city, Osaka (JP), 573-0084; Seiji Akita, Izumi (JP); Akio Harada, Osaka (JP)

(73) Assignees: Daiken Chemical Co., Ltd., Osaka (JP); Yoshikazu Nakayama, Osaka (JP)

( * ) Notice: Subject to any disclaimer, the term of this patent is extended or adjusted under 35 U.S.C. 154(b) by 0 days.

(21) Appl. No.: 10/391,386

(22) Filed: Mar. 18, 2003

(65) Prior Publication Data

US 2003/0186625 A1 Oct. 2, 2003

(30) Foreign Application Priority Data

Mar. 18, 2002 (JP) ..................................... 2002-074353

(51) Int. Cl.[7] ............................................. B23K 11/22
(52) U.S. Cl. ......................................................... 219/68
(58) Field of Search ...................... 219/68, 69.1, 69.12; 83/16, 15; 73/105

(56) References Cited

U.S. PATENT DOCUMENTS

| | | | | |
|---|---|---|---|---|
| 4,743,730 A | * | 5/1988 | Martin et al. | ............ 219/69.12 |
| 4,778,972 A | * | 10/1988 | Josserand | ................ 219/69.12 |
| 2003/0233871 A1 | * | 12/2003 | Nguyen et al. | ............... 73/105 |

FOREIGN PATENT DOCUMENTS

| | | |
|---|---|---|
| JP | 2000-227435 | 8/2000 |
| JP | 2000-249712 | 9/2000 |
| JP | 2002-243880 | 8/2002 |

OTHER PUBLICATIONS

"Engineering Carbon Nanotubes and Nanotubes Circuits Using Electrical Breakdown", Philip G. Collins et al., Apr. 27, 2001, SCIENCE, vol. 292, pp. 706–709.*

* cited by examiner

*Primary Examiner*—Geoffrey S. Evans
(74) *Attorney, Agent, or Firm*—Koda & Androlia

(57) ABSTRACT

A method for sharpening a nanotube including the steps of: connecting the base end portion of a nanotube to an electrode with the tip end portion of the nanotube protruded from the electrode; connecting the tip end portion of the nanotube to another electrode; applying a voltage between the electrodes so as to cause an electric current to flow in the middle portion of the nanotube which is located between the two electrodes; evaporating constituent atoms of the nanotube layer by layer from a evaporation starting region, which is located in the middle region of the nanotube (and can be a crystal defect region, or a curved portion), by the heat generated by the electric current, thus reducing the diameter of the evaporation starting region; and cutting the evaporation starting region that has the reduced diameter, thus forming a sharpened end on the nanotube.

7 Claims, 6 Drawing Sheets

SHARPENING METHOD OF NANOTUBES

BACKGROUND OF THE INVENTION

1. Field of the Invention

The present invention relates to a nanotube product such as a nanotube probe needle for AFM, a light emissive and absorptive nanotube probe, a nanotube heat generation probe, etc., in which a nanotube is protruded from a holder thereof, and more particularly to a sharpening method of nanotubes in nanotube products that produces nanotubes having sharpened tip ends which are used for operating a sample surface, thus improving the operation precision of a nanotube.

2. Prior Art

Recently in order to observe the surface structure of a material, an atomic force microscope (abbreviated as AFM) has been used. AFM has a semiconductor cantilever which is constructed by forming a protruding portion at the cantilever portion, so that unevenness (projections and indentations) on the surface of the material can be imaged by means of scanning the surface of the material, using the tip end of the protruding portion as a probe needle.

In order to make the semiconductor cantilever higher efficient, the inventors of the present application have invented a nanotube cantilever wherein a nanotube such as a carbon nanotube, etc. is fastened at the protruding portion of the semiconductor cantilever with a coating film or by means of an electric current fusion welding. The high quality AFM which can image the surface of the material in the precision same as the section diameter of the nanotube is realized, owing to use the tip end of the nanotube protruded downward as a probe needle point. This has been published in Japanese Patent Application Laid-Open (Kokai) No. 2000-227435 and No. 2000-249712.

Moreover, the inventors accomplished a heat generation probe that records information by means of an on-off mode which is formed with fusion welded holes. In this heat generation probe, a nanotube is fastened at the protruding portion of a semiconductor cantilever with a coating film or by an electric current fusion welding, a heat generation material is held at the tip end portion of the nanotube, and the on-off mode is formed with the fusion welded holes by means of heating the surface of an organic material in a pin-point fashion. This has been published in Japanese Patent Application Laid-Open (Kokai) No. 2002-243880.

The inventors further invented a light receiving and emitting probe that irradiates light on a sample surface in a pin-point fashion and receives light emitted from a sample in a pin-point fashion. In this light receiving and emitting probe, a nanotube is fastened by a similar means as described above at a protruding portion of a semiconductor cantilever, and a light receiving and emitting material is held at the tip end portion of the nanotube. This has been proposed in Japanese Patent Application No. 2001-81672.

In this way, various nanotube products have been developed such as a nanotube cantilever, a nanotube heat generation probe, a light receiving and emitting nanotube probe, etc.; and it is expected that various nanotube products that use such nanotubes will increase from now on.

These nanotube products are to positively utilize the characteristics that the section diameter of the nanotube is extremely fine. The section diameter of the nanotube is distributed in from several nm to several tens nm, and the extreme fineness of the nanotube diameter can be understood from the fact that theoretical minimum diameter of the nanotube is inferred to be about 1 nm. It is understood that the tip end of the nanotube product is excellent in the degree of fineness (sharpness), by comparing with the protruding tip end portion of the usual semiconductor cantilever, of which diameter is from several 10 nm to about 100 nm.

However, an arc discharge method or a chemical vapor deposition method (CVD method) produces a large quantity of carbon fine powder, and the carbon fine powder contains a large quantity of carbon materials other than carbon nanotubes. Therefore, the operation to pick out selectively nanotubes from this carbon fine powder is necessary, when a nanotube product is manufactured. More specifically, the additional operation which picks out an extremely fine nanotube from the nanotubes is necessary, when an extremely fine nanotube is requested in order to improve the degree of sharpness of a tip end.

It is difficult to see an extremely fine nanotube by an electron microscope, and even if the nanotube can been seen, it is difficult to take out one nanotube from a lump of nanotubes, as many extremely fine nanotubes often form a bundle. Furthermore, in practice an extremely fine nanotube cannot be used as a nanotube probe in many cases, since an extremely fine nanotube is too highly flexible, so that the nanotube is like thread trash.

For such a reason, a nanotube product usually uses a comparatively thick nanotube, which has a section diameter of ten and several nm or more so that the nanotube has somewhat rigidity. However, when the nanotube of such a large diameter is used, there is a limit in precision of size in the operation of the nanotube product.

FIG. 8 is an AFM measurement diagram imaging the surface of a sample by the nanotube cantilever which uses a usual large diameter nanotube. A nanotube cantilever 6 comprises a protruding portion 10 which is formed at a cantilever 8 made of semiconductor and a nanotube 12 which is fastened with a coating film 14 at the protruding portion 10.

The nanotube 12 is a large diameter nanotube that the section diameter is supposed to exceed 10 and several nm. In order to image the sample surface 22 of a sample 20, the tip end portion 12g of the nanotube is caused to approach to or contact with the sample surface 22 so as to detect the force acting on the nanotube 12 from projections and indentations on the sample surface 22 by a laser beam so on, and the information is imaged in a display.

In the sample surface 22, there exist many projections and indentations which contain widely from indentations with gentle inclination to indentations with steep inclination. On the other hand, the image of the indentation portion becomes unclear, when the diameter of the indentation portion is 10 and several nm or less, since the section diameter of the nanotube 12 exceeds 10 and several nm. In other words, when the section diameter of the nanotube 12 is large, as shown in the Figure, the tip end portion 12g cannot follow the inside of the indentation 22a, so that there exists a limit in the image precision of the sample surface. Namely, there exists the limit in precision as for the usual nanotube cantilever, according to a nanotube diameter. Such a fault exists in common in other nanotube products as well.

Next, the cause that the diameter of a nanotube becomes large is explained. There are a single layer nanotube (SWNT) and a multiple layer nanotube (MWNT). The single layer nanotube is such that a graphite layer surrounds a hollow portion in a cylinder shape and the multiple layer nanotube is such that multiple graphite layers surround a hollow portion in a concentric cylinder shape.

The above-described nanotube that theoretically minimum diameter is 1 nm is the single layer nanotube, and a graphite sheet (graphite net) is rolled strongly in a cylinder form with a minimum diameter. But, in practice, nanotubes manufactured by means of an arc discharge method or a chemical vapor deposition are almost multiple layer nanotubes, so that a procedure is necessary to find out extremely fine nanotubes from a large quantity of carbon fine powder. Besides, an extremely fine nanotube such as a single layer nanotube is like thread trash and is hardly useful.

As a result, a multiple layer nanotube with somewhat rigidity is used. Among the multiple layer nanotubes, if a tip end portion is closed in an acute angle fashion, the degree of sharpness of the tip end may be improved due to the acute angle shape of the tip end. However, the procedure to find out the nanotube which has the acute angle tip end is necessary, and even if obtaining acute angle nanotubes, the nanotube product of the same quality cannot be provided, if the acute angle of the nanotube is different in every nanotube. Of course, a high-resolution power cannot be gotten by a non-acute angle nanotube.

In other words, practically utilized nanotubes are multiple layer nanotubes which are selectively picked out from a large quantity of the manufactured carbon fine powder, and the number of graphite layers is usually from several layers to several ten layers or more. The section diameter of a nanotube which possesses many layers is necessarily large, and distributes in a wide range of 10 and several nm to several hundreds nm.

Namely, an extremely fine nanotube such as a single layer nanotube which is selectively picked out by worker's perseverance and the zeal cannot be utilized due to the property like thread trash. On the other hand, there is a limit in the degree of sharpness of a tip end in the case of a multiple layer nanotube, of which section diameter is ten and several nm or more. Hence, even the selected nanotube with an acute angle tip end lacks in the stability of quality of a nanotube product as the acute angles are not uniform.

SUMMARY OF THE INVENTION

Accordingly, it is an object of the present invention to provide a sharpening method of nanotubes by which the tip end portion of a multiple layer nanotube with a large section diameter is sharpened.

It is another object of the present invention to provide a sharpening method that remarkably improves the operation precision of a nanotube product more than the ordinary method by means of sharpening the tip end portion of a nanotube at a later time, even if a nanotube with a comparatively large section diameter is used in a nanotube product.

The above object is accomplished by unique steps of the present invention for a sharpening method of nanotubes, and such steps comprises:

connecting the base end portion of a nanotube to an electrode with the tip end portion of the nanotube protruded from the electrode;

connecting the tip end portion of the nanotube to another electrode;

applying a voltage between the electrodes so as to cause an electric current to flow in the middle portion of the nanotube which is located between the two electrodes;

evaporating constituent atoms of the nanotube layer by layer from a evaporation starting region, which is located in the middle region of the nanotube, by the heat generated by the electric current, thus reducing the diameter of the evaporation starting region; and cutting the evaporation starting region having the reduced diameter, thus forming a sharpened end on the nanotube.

According to this method, a nanotube with a sharpened tip end is obtained before a nanotube product is completed; and then the nanotube for which the sharpening treatment is made can be installed in a nanotube product. Accordingly, a nanotube product improved remarkably in operation precision is obtained. Moreover, according to the method of the present invention, the diameter of the sharpened nanotube tip end becomes the same as the diameter of most inside layer of the nanotube. Accordingly, a nanotube that possesses the rigidity same as a multiple layer nanotube as well as the tip precision (the sharpness of a tip end) same as a single layer nanotube is obtained. Moreover, by sharpening a recently discovered multiple layer nanotube that has a diameter of about 0.4 nm in its most inside layer with the use of the method of the present invention, a nanotube that has an improved tip precision up to 0.4 nm can be produced.

The above object is accomplished by another unique steps of the present invention for a sharpening method of nanotubes used in nanotube products in which the base end portion of a nanotube is connected to a holder with the tip end portion of the nanotube protruded from the holder; and the unique steps comprises:

connecting the tip end portion to an electrode;

applying a voltage between both end portions of the nanotube so as to cause an electric current to flow in a middle portion of the nanotube which is located between the holder and the electrode;

evaporating constituent atoms of the nanotube layer by layer from a evaporation starting region, which is located in the middle region, by heat generated by the electric current, thus reducing a diameter of the evaporation starting region; and cutting the evaporation starting region having the reduced diameter, thus forming a sharpened end on the nanotube.

The above method advantageous in that a nanotube product formed with an un-processed nanotube is prepared beforehand, and the nanotube of the nanotube product is sharpened later. Accordingly, an improved operation precision of the nanotube is obtained, and the nanotube product is assembled while sharpening the un-processed nanotube. The nanotube product is satisfactory both in the rigidity of the nanotube and in the high resolution power and can be used in a more stable fashion than a single layer nanotube even in the case that the sharpened nanotube is used in a chemical force microscope after applying chemical function group to the tip end.

In the above methods of the present invention: the temperature of the central portion of the nanotube can be set higher than temperatures at both ends of the nanotube by way of using both end portions of the nanotube as heat absorption openings; and the central portion is set in the middle portion of the nanotube, thus allowing the central portion to be used as the evaporation starting region of the nanotube.

Therefore, the central portion of the nanotube can be sharpened without considering the evaporation starting region at all.

Furthermore, in the present invention, a defect, which is made on the surface or the inside of the nanotube during production of the nanotube, is detected by, for instance, an electric microscope, and the nanotube is arranged so that the defect is located in the middle portion of the nanotube. The defect portion is high in electric resistance. Thus, using the property that the defect portion has high electric resistance, the nanotube is formed with a sharpened end using the defect as the evaporation starting region.

In the present invention, the evaporation starting region can be artificially formed at a desired position in the middle portion of a nanotube. The artificially formed evaporation starting region is high in electric resistance. Accordingly, using the property that the evaporation starting region made artificially has high electric resistance, constituent atoms in the nanotube are evaporated from this artificially formed evaporation starting region, thus obtaining a sharpened end on the nanotube.

Furthermore, in the present invention, a defect can be artificially formed at a desired position in a middle portion of the nanotube by means of a mechanical operation or a particle beam irradiation. The artificially formed defect is high in electric resistance. Accordingly, using the property that the defect portion has high electric resistance, constituent atoms in the nanotube are evaporated from this artificially formed defect portion, thus sharpening the tip end of the nanotube. It is an advantage of this method that particle beam irradiation such as an electron beam or an ion beam, etc. is easily performed in order to form the defect by an existent electron microscope or an existent ion beam apparatus.

In the present invention, the middle portion of the nanotube can be curved by an external force. The maximally curved portion of the middle portion is high in electric resistance; and using the property that the maximally curved portion has high electric resistance, constituent atoms in the nanotube are evaporated from this maximally curved portion, thus forming the nanotube with a sharpened end thereon.

DETAILED DESCRIPTION OF THE INVENTION

Figure 1:
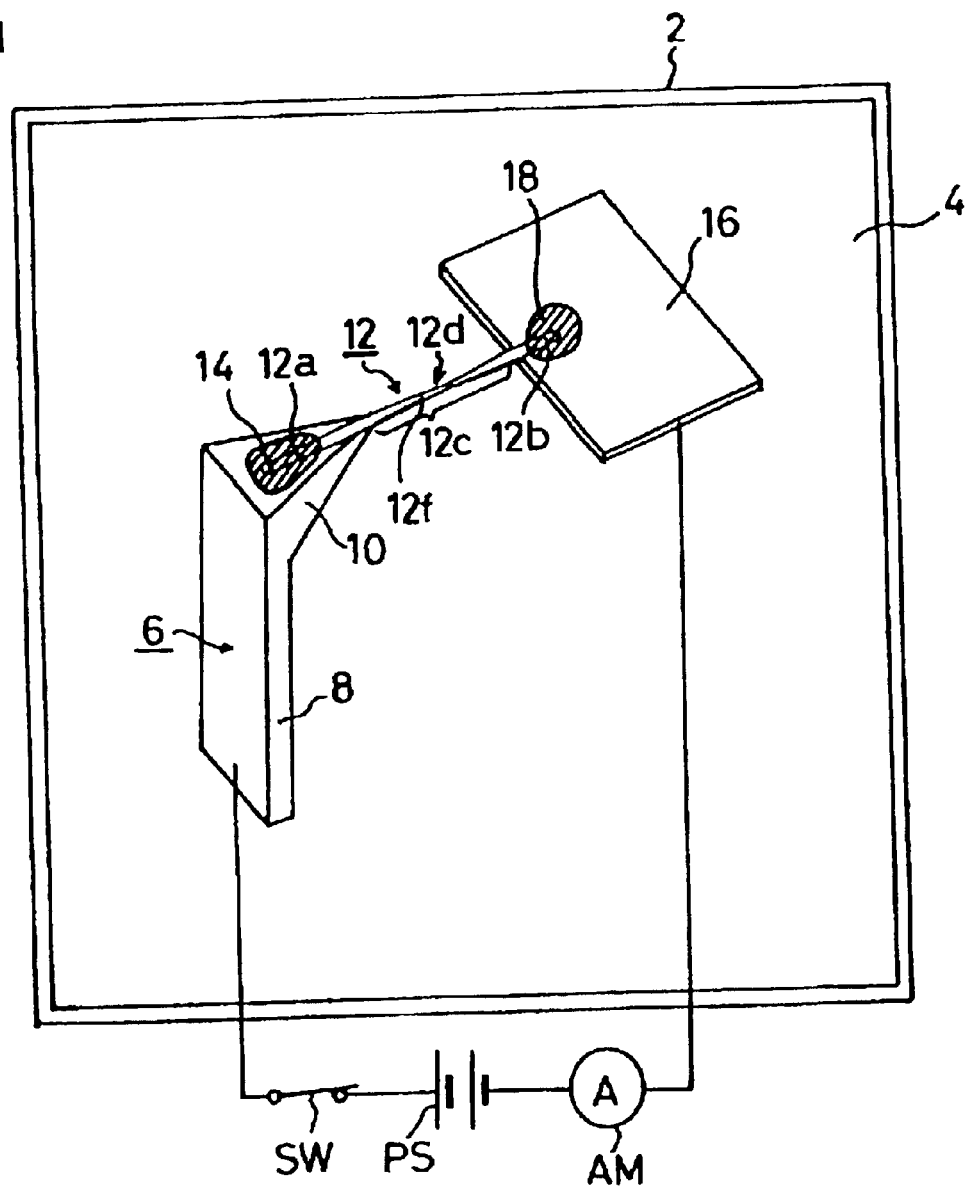
FIG. 1 is a schematic instruction diagram of a sharpening method of nanotubes according to the present invention.

The inventors of the present patent researched diligently concerning the sharpening of nanotubes, as the result of this research, the inventors reached to utilize the method which striped off each layer of a multiple layer nanotube using heat generated by an electric current. A phenomenon which each layer is striped off due to the electric current heat was discovered in 2001 by Philip et al. (Philip G. Collins, Michael S. Arnold, Phaedon Avouris, *Science*, Vol. 292 (2001) 706–709).

Philip et al. discovered the fact that during a composition experiment of electron elements using a carbon nanotube, an electric current, which is induced by a electric voltage applied to a nanotube bridged between line shape electrodes, decreases stepwise with the passage of time and the section diameter of the carbon nanotube between the two electrodes also reduces to be finer than the section diameter of the nanotube of the electrode side.

Philip et al. inferred like that an electric current in the nanotube flows mainly in the extreme outside layer, and a graphite layer of the extreme outside layer is oxidized and evaporated owing to heat generated by the electric current, and next the exposed second graphite layer is oxidized and evaporated. Repeating this process successively, the section diameter of the carbon nanotube reduces gradually to become finer.

On the basis of the fact that was discovered by Philip et al., the inventors reached to the idea for the sharpening method of nanotube. The inventors of the present application got the idea that the section diameter of a nanotube not only reduces to be finer owing to heat generated by an electric current, but also the tip end portion of the nanotube must be sharpened in a taper shape so that a cut portion becomes a tip end by means of continuing to flow the electric current until the nanotube is cut.

In the process that the evaporation of an extreme outside layer is running out to front and rear portions of the nanotube, the evaporation of second layer occurs in this region at the same time due to the increase of electric resistance of an evaporation starting region, and by repeat of the process, each layer of the evaporation starting region starts to evaporate successively. As the result, the evaporation starting region turns to be extremely fine so that the appearance of the nanotubes in right and left sides changes to a bamboo shoot shape(taper shape), and furthermore the sharpened nanotube that the cut portion turns to be a tip end is formed, if the electric current is continued until the evaporation starting region is cut away.

The inventors further developed this technological idea up to a method such that the evaporation starting region can be set up at will. The present invention provides two kind evaporation starting regions. First evaporation starting region is set on a highest temperature area. Since both ends of the nanotube are connected to an electrode and a holder, both ends of the nanotube, where heat is generated due to an electric current, turn to be absorption openings of heat, and then the temperature of the regions is lowered and the temperature of the nanotube central portion rises up to a highest temperature. Therefore, the evaporation starting region is this highest temperature area which is the central portion. Second evaporation starting region is an area where heat is most generated due to the electric current, and in other words, it means that the area is the increase region of electric resistance in the inside of the nanotube. The evaporation of the nanotube starts from this most heat generation region.

In a case where the characteristic property of heat absorption at both ends of the nanotube is same and there are no crystal defects, etc. inside the nanotube, since the above-described highest temperature region is the center of the nanotube, a sharpened region can be set up in the manner that the central portion turns to be a cut point, by disposing the nanotube such that the central portion exists in the middle portion of the nanotube. The sharpening operation gets comparatively easy in this case, since the central portion of the nanotube is set to be the evaporation starting region.

The increase area of electric resistance in the latter is the region of a crystal defect on the surface or the inside of a nanotube. This fact was discovered by the inventors of the present application. Therefore, by means of observation with an electron microscope and so on, the defective portion (namely a wound) of a nanotube is found, then the nanotube may be properly disposed so that the defective portion turns out to be the evaporation starting region.

When there is no defect in a nanotube, a defect may be made artificially on the surface of the nanotube by an external force. As for the external force, it is conceivable to use a method that a high electric field is applied from the tip end of other nanotube in order to emit constituent atoms by the electric field. But, if a particle beam such as a strong electric beam etc., specifically an ion beam is irradiated to the surface of a nanotube in order to emit constituent atoms, a defect can be artificially made in an easy way, so that the defective region works as an artificial evaporation starting region.

When a nanotube is bent mechanically, the section diameter of the maximally curved portion turns to be smaller than other portions by the bending power, as the result, the electric resistance of the maximally curved portion increases, so that the maximally curved portion is available as an artificial evaporation starting region. This means that an evaporation starting region is not limited to the crystal defect.

The essential point of the present invention is that the sharpening of a nanotube can be realized, by continuing to flow an electric current, until the nanotube is cut owing to heat generated by the electric current, and furthermore, that this cut portion is the evaporation starting region in the nanotube, and the cut potion contains the central portion of the nanotube which reaches the highest temperature, a crystal defective region and a maximally bent portion, etc. Moreover, it was discovered that as for the crystal defect, not only a natural defect but also an artificial defect can be utilized as the evaporation starting region so that the evaporation starting region can be set up at a request position in the nanotube. Thus a sharpening technology of nanotubes has been completed by which the tip end can be made at an arbitrary position of the nanotube.

In order to more deeply disclose the technical idea of the present invention, in the following, the embodiment of the sharpening method of nanotubes, which is related to the present invention, will be described in detail in accordance with drawings.

FIG. 1 is a schematic instruction diagram of the sharpening method of nanotubes which is related to the present invention. An electron microscope 2 possesses an electron microscope room 4 which is set up in vacuum, and the sharpening treatment is operated in this electron microscope room 4 in which all parts of a sharpening device are disposed.

As one of nanotube products, the sharpening treatment of the nanotube cantilever 6 for AFM is described. The nanotube cantilever 6 comprises a conductive cantilever 8, at the tip end of which a protruding portion 10 is formed, and a nanotube 12 that the base end portion 12a is fastened with a base end coating film 14 to the protruding portion.

Partial materials to which the nanotube 12 is fastened are called a holder together in the present invention, then the cantilever 8 and the protruding portion 10 are just its parts, and the forms and the qualities of the parts are different according to nanotube products such as the nanotube probe of heat generation, a light emissive and absorptive nanotube probe, a nanotube tweezers, a nanotube magnetic head etc.

This nanotube 12 is a conductive multiple layer nanotube, of which concrete example is a multiple layer carbon nanotube. The tip end portion 12b of the nanotube 12 is connected to an electrode 16 which comprises a knife edge, etc. and is immovably fastened with a tip end coating film 18. The electric contact with each other among the nanotube 12, the cantilever 8 and the electrode 16 is assured by the base end coating film 14 and the tip end coating film 18.

The region of the nanotube 12 disposed between the protruding portion 10 and the electrode 16 is called a middle portion 12c, and an evaporation starting region 12d exists in the middle portion 12c. This evaporation starting region 12d is the region, in which there are the highest temperature region (the central portion of the nanotube), the crystal defective region and the maximally curved region which is formed by a mechanical force acting the nanotube. In the present embodiment, the defective region is utilized as an evaporation starting region 12d. As for these details, it will be described later. A switch SW, a power supply PS and an ammeter AM are linearly connected between the cantilever 8 and the electrode 16.

When the switch is turned on, an electric current flows out from the anode of the power supply PS, and the electric current flows through the circuit in sequence of from the cantilever 8 to the protruding portion 10, to the nanotube 12, to the electrode 16 and to the ammeter AM. In the nanotube 12, the electric current flows in the direction from the base end portion 12a to the middle portion 12c and to the tip end portion 12b.

As above-described, the nanotube 12 is a multiple layer nanotube and includes an evaporation starting region 12d in the middle portion 12c. In this embodiment, the region of especially high electric resistance, such as the defect or the maximally curved portion in the nanotube 12, is supposed as the evaporation starting region 12d.

Joule heat generated by the electric current is remarkably generated in the evaporation starting region 12d of high electric resistance. Since the electric current flows specifically an extreme outside layer, the evaporation starts from the nanotube constituent atoms of the extreme outside layer. When the evaporation starting region 12d begins to evaporate locally, the section area of the nanotube reduces so that electric resistance of the region rises up more, and then the local evaporation is accelerated.

As the result, the evaporation proceeds to right and left of the evaporation starting region 12d, and the evaporation starting region 12d becomes thin gradually, so that the surface of a taper shape 12f of which diameter gradually reduces is formed on the right and left side of the central portion 12c of the nanotube so as to make the evaporation starting region 12d become a minimum diameter portion, as shown in the Figure.

Figure 2:
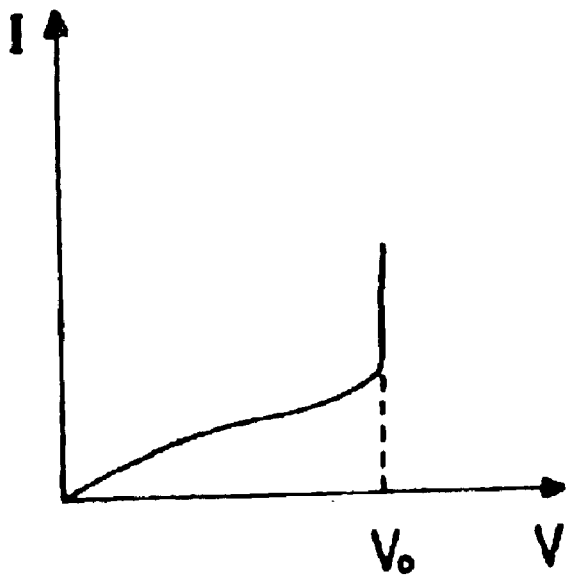
FIG. 2 is a graph showing the relation between a voltage applied to a nanotube and an electric current.

FIG. 2 is the correlation graph of a voltage applied to a nanotube versus an electric current. When an applied voltage V is gradually raised, the phenomenon that an electric current I increases rapidly at the stage of a certain voltage $V_0$ is observed. The rapid increase of the electric current is measured by an ammeter AM. Afterward the voltage is fixed at the voltage $V_0$ where the electric currents I increased rapidly.

Figure 3:
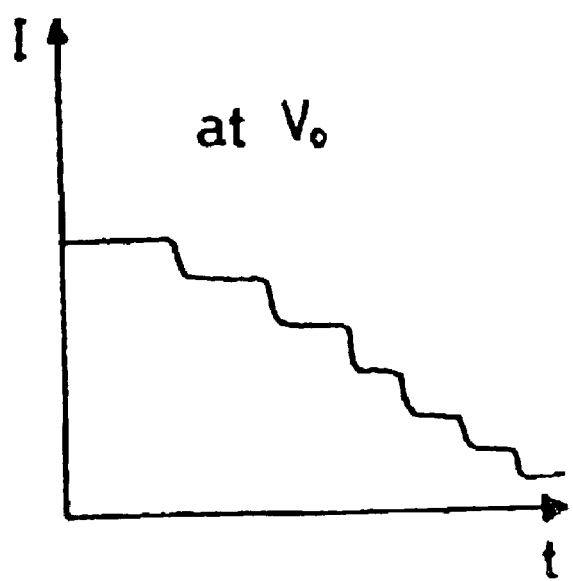
FIG. 3 is a graph showing the time progress of an electric current that flows in a nanotube.

FIG. 3 is a graph showing the change of an electric current which flows in a nanotube versus time. Though the voltage $V_0$ is set up at the constant value, nevertheless it is seen from the observation of the ammeter AM that the electric current I is stepwise decreasing with a progress of time t. It means that the electric resistance R of the nanotube 12 is stepwise increasing, because electric resistance is given by $R=V_0/I$.

Figure 4:
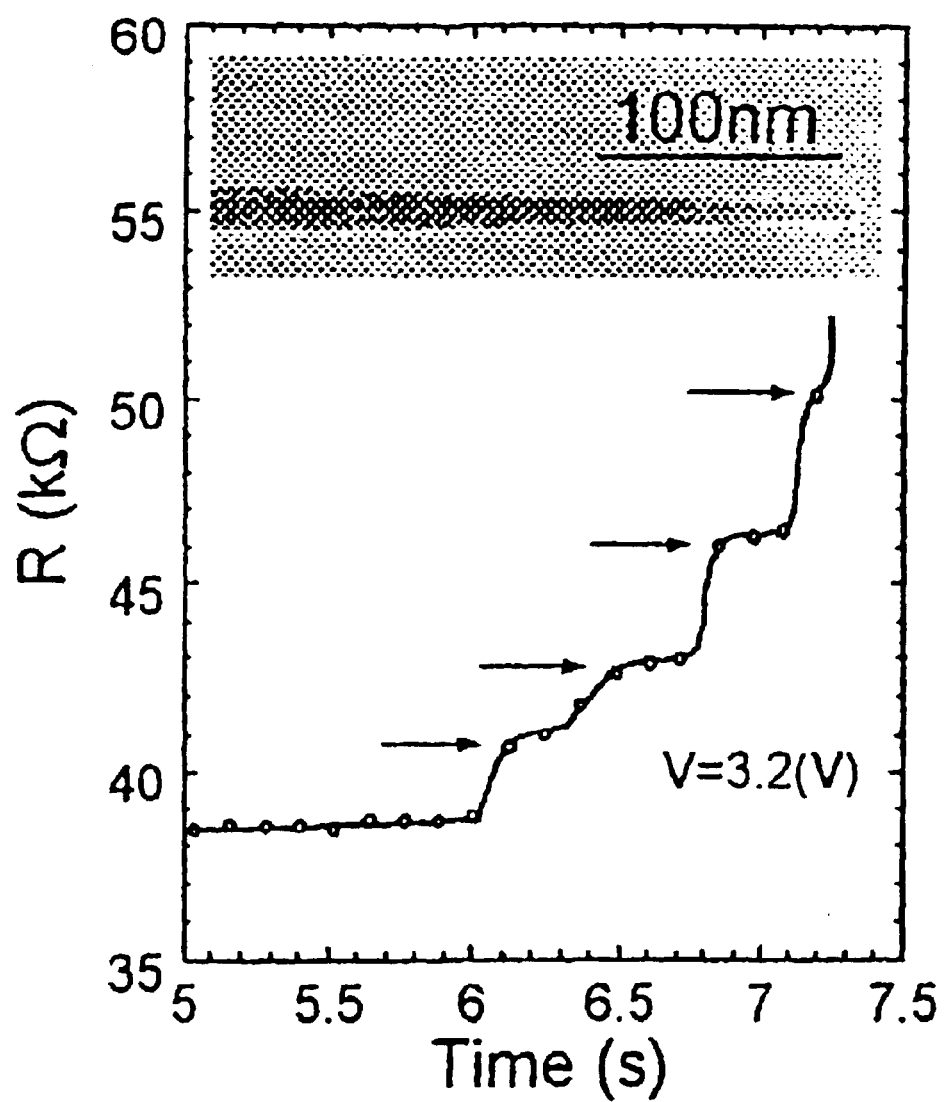
FIG. 4 is a graph showing the time progress of a nanotube electric resistance which is measured during the sharpening of a nanotube, including an inset enlarged picture of a sharpened end of a nanotube.
Figure 5A:
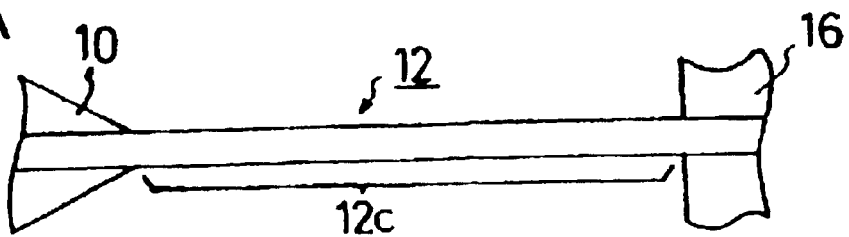
FIGS. 5A through 5F are diagrams showing the deformation of a nanotube when a defective region in a nanotube is used as the evaporation starting region.
Figure 5B:
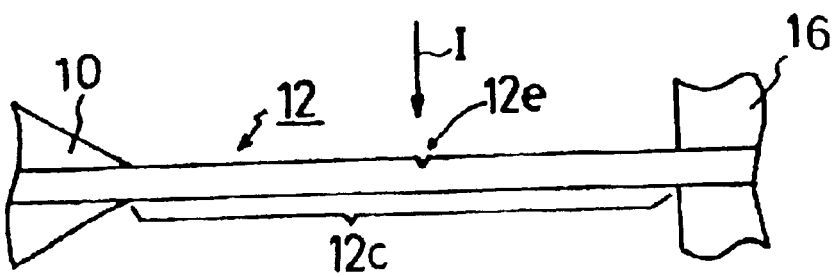
Figure 5C:
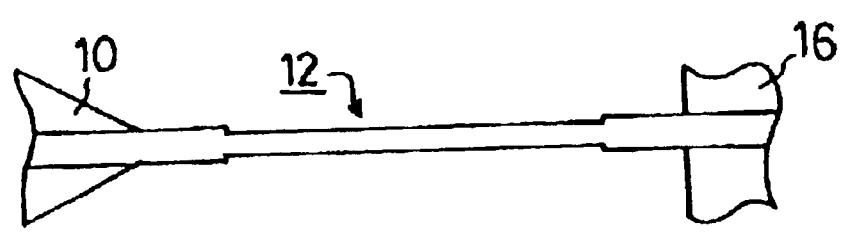
Figure 5D:
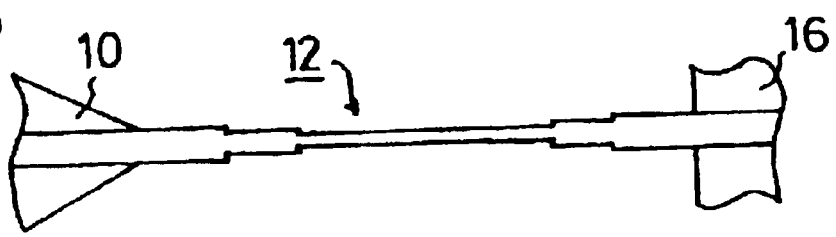
Figure 5E:
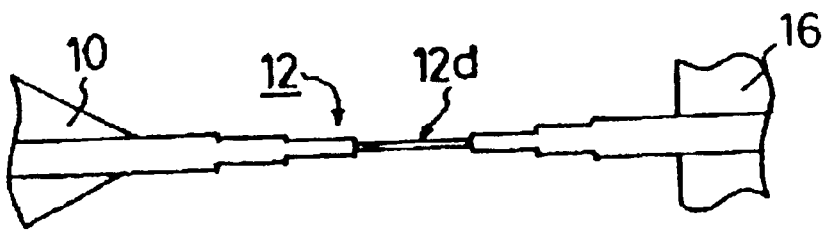
Figure 5F:
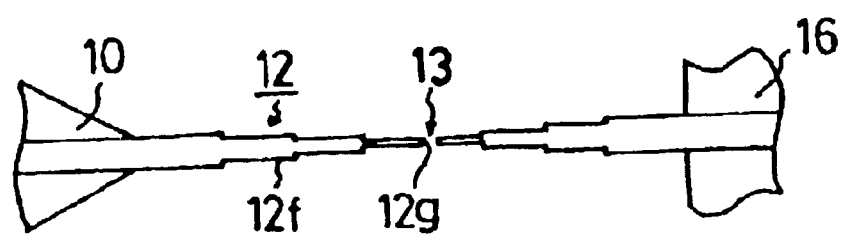

FIG. 4 is a graph showing a time change of nanotube electric resistance which is measured during a nanotube sharpening. This measurement was done in the inside of a scanning type electron microscope under the condition that air pressure is set up at $2 \times 10^{-4}$ Pa in room temperature. Moreover, the experiment was carried out wherein a defect was found in the nanotube by observing the electron microscope image and the defective region was disposed as an evaporation starting region.

Raising up gradually an electric voltage, the electric current increased rapidly at the voltage $V_0=3.2V$, so that afterward the voltage value was fixed at 3.2V. It was found that the electric current decreased with the time progress, namely the electric resistance R increased stepwise like an arrow sign according to the change of the electric resistance R under this condition.

It is confirmed that the nanotube was cut at the above-described defective region, by means of continuing to supply the electric current until the nanotube was cut. FIG. 4 is showing the electron microscope image of a nanotube which is obtained after the nanotube was cut. It is clearly seen that the more moving to right side of the nanotube, the finer a taper shape of the nanotube becomes. The tip end where a section diameter is minimum is the cut portion where the defect exists.

As seen from FIG. 4, the evaporation starts successively from the extreme outside layer and the evaporation point of each layer runs right and left around the cutting portion. The closer to the extreme outside layer, the earlier the evaporation of a layer progresses; and the more inside a layer being, the later the evaporation of layers progresses. As the result, it is phenomenally understandable that the apparent shape of the nanotube is formed in a taper shape.

FIGS. 5A through 5E are diagrams which illustrates the shape change of a nanotube according to the first mode (a defective region being a evaporation starting region) of the sharpening method of nanotubes of the present invention. This diagram illustrates schematically the process wherein the taper shape shown in FIG. 4 is being formed. The nanotube 12 is bridged from a protruding portion 10 to an electrode 16 in the diagram 5A.

An ion beam I is irradiated into an adequate position of the surface of the nanotube 12 in order to make a defect 12e. In FIG. 4, the nanotube 12 is arranged so that a defect 12e which exists naturally is disposed at an adequate position of the middle portion 12c of the nanotube 12. Supposing that the defect 12e is located in the middle portion 12c, irrespective to a natural defect or a forcedly formed defect, the following process will be examined.

When electric current is caused to flow in the nanotube 12, heat is generated in the whole of the nanotube. Especially electric resistance in the neighborhood of the defect 12e is larger than other parts, so that the evaporation of the extreme outside layer starts at the position of the defect 12e owing to the heat generation. The evaporation point moves to right and left and the extreme outside layer is striped off by evaporation as shown in 5C.

Since the evaporation of a second layer begins, before the form of 5C is completed and an evaporation point of the second layer also moves to right and left, then the form of 5D is formed. Furthermore, the evaporations of third and fourth layers progress to right and left, while these evaporations being repeated, many steps on a right and a left side centering the defect 12e are formed on the outer surface around the nanotube 12 as shown in 5E. FIG. 1 is supposed to be the mode of 5E.

In the present invention, this evaporation is caused to be continued further, until the nanotube 12 is cut away to a right and a left side at the cut portion 13 by continuing to flow the electric current. When the nanotube is cut away, the electric current is broken at the cut portion 13, then the mode of 5F is completed. The position of the cut portion 13 is very close to the defect position 12e. In other words, the nanotube is divided into a right and a left side at the position of the defect 12e, so that the sharpening of the nanotube 12 can be realized.

The left half of the nanotube 12 remains in the protruding portion 10, and the outer surface around the tip end portion of the nanotube 12 turns to be a taper surface 12f, so that a extremely fine tip end 12g is formed. Therefore, a nanotube cantilever 6 that is sharpened extremely fine is manufactured. The section diameter of the tip end 12g is same as the diameter of the extreme inside layer of the nanotube 12 and is about 1 nm or less in the degree of precision.

As described above, although theoretical maximum value is about 1 nm in a single layer nanotube, a multiple layer nanotube that the hollow section diameter is about 0.4 nm has been discovered. Then, a nanotube that the section diameter of the tip end 12g is close to 0.4 nm can be formed by sharpening such a multiple layer nanotube. Therefore, by applying the sharpening method of the present invention to nanotubes in a range from a molecular size to an atom size, a nanotube cantilever with super high resolution power can be produced, to which region the ordinary nanotube cantilever has been impossible to reach.

Figure 6A:
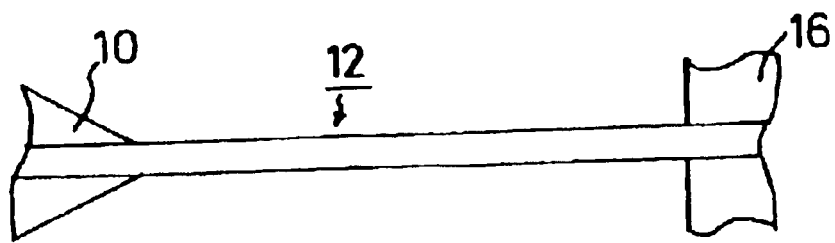
FIGS. 6A through 6D are diagrams showing the deformation of a nanotube when a maximally curved portion in a nanotube is used the evaporation starting region.
Figure 6B:
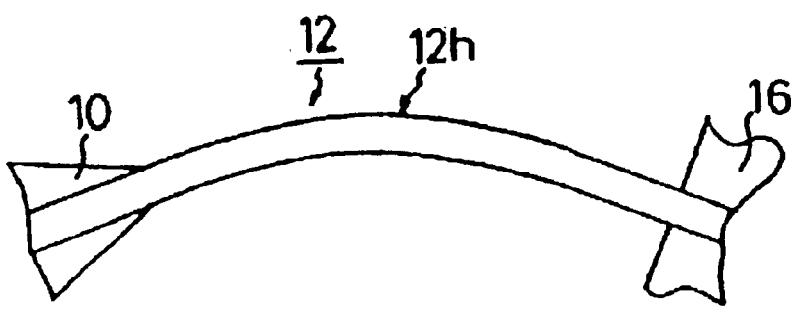
Figure 6C:
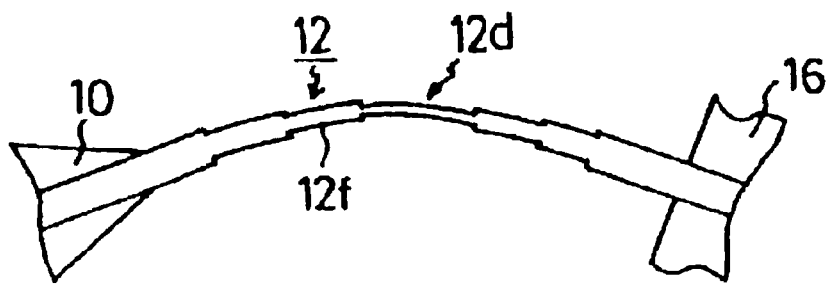
Figure 6D:
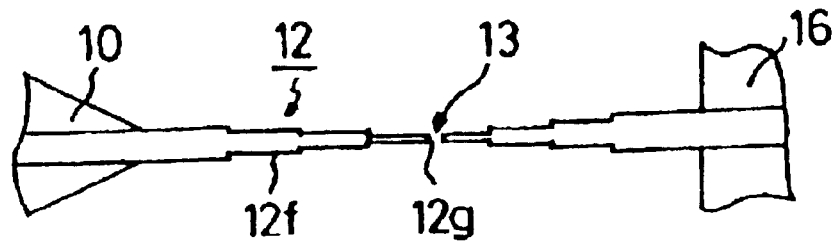

FIGS. 6A through 6C are diagrams of nanotube deformation (a maximally curved portion is set as the evaporation starting region) by means of the second mode of the sharpening method of nanotubes. In the second mode, in the stead of forming a defect in a nanotube, a nanotube is caused to curve by acting a bending power to the nanotube, and a maximally curved portion which is formed due to the curving deformation is utilized as an evaporation starting region.

The nanotube 12 is bridged between a protruding portion 10 and an electrode 16 as shown in 6A. When a cantilever 8 is caused to move in FIG. 1, a bending force acts to the nanotube 12, so that the nanotube 12 bends as shown in 6B. At this time, a nanotube section diameter of the maximally curved portion 12h slightly reduces so that the portion of electric resistance slightly increases rather than other portions.

In other words, if an electric current is caused to flow in the nanotube 12, the maximally curved portion 12h turns to be an evaporation starting region, so that as shown in 6C, an evaporation occurs on a right and a left side centering the maximally curved portion 12h in each layer, and the surface of a taper shape 12f with steps is formed.

When the electric current is caused to continue, the nanotube 12 is cut away to right and left at a cut portion 13, thus the nanotube cantilever 6 which comprises the tip end 12g and the taper shape surface 12f is completed. A cut portion 13 is in the neighborhood of the maximally curved portion 12h.

Figure 7:
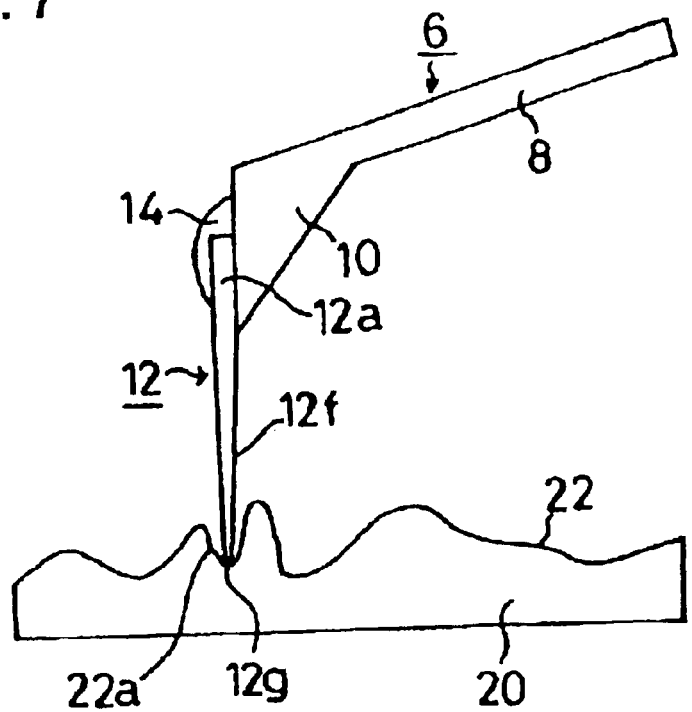
FIG. 7 is an AFM measurement diagram of a sample surface obtained by the use of a sharpened nanotube cantilever.
Figure 8:
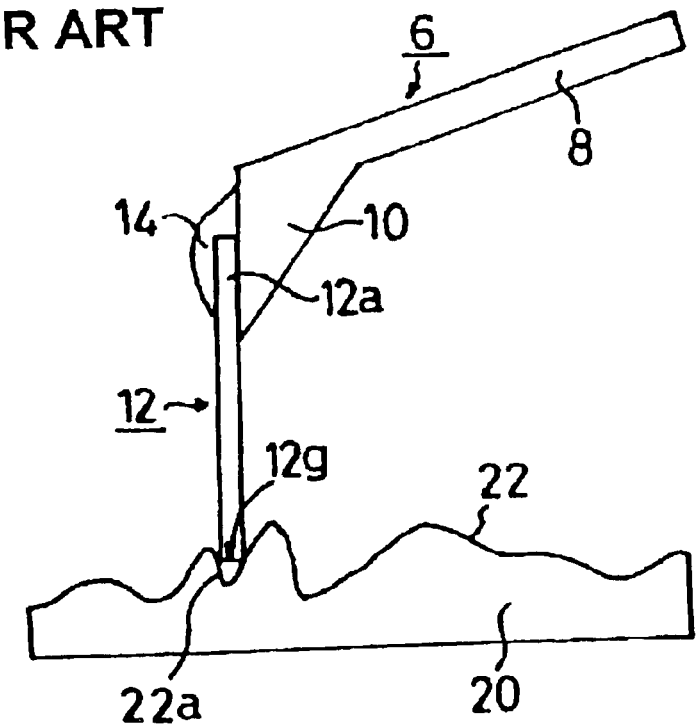
FIG. 8 is an AFM measurement diagram imaging a sample surface by a nanotube cantilever which is made of prior art nanotube of a large diameter.

FIG. 7 is a diagram illustrating an AFM measurement of a sample surface by using a sharpened nanotube cantilever.

Optional projections and indentations 22a which are small and deep in the sample surface 22 can be scanned by AFM with high resolution, since a taper shape surface 12f of the nanotube 12 is extremely fine and moreover the sharpened tip end 12g is sharpened up to 1 nm or less. It can be appreciated that the image of a sample surface which is thus obtained is quite clear and highly fine.

As above-described, the evaporation starting region can be designed as a highest temperature area. Both ends of the nanotube where heat is generated by an electric current turn to be absorption openings of heat and the temperature lowers, then the central portion of the nanotube reaches a highest temperature. In this embodiment, the evaporation starts in the central portion which is the highest temperature area, and the sharpening occurs in the central portion of the nanotube, so that the nanotube is cut away at the central position. Other detail contents are omitted, because those are same as the above-described embodiment.

In the above, since the sharpening method of nanotubes is described by taking a nanotube cantilever as an example, the sharpening method is composed by using a cantilever 8 as an electrode. An electric power supply may be connected directly with the nanotube base end portion 12a in FIG. 1, when the cantilever 8 is made of insulation material.

Moreover, as for cantilever products, there are not only the nanotube cantilever 6, but also so many products such as a heat generation nanotube probe, a light emissive and absorptive nanotube probe, a nanotube magnetic head, a nanotube tweezers, etc., which have been developed so far by the inventors. The present invention includes all nanotube products in which the tip end portion of the nanotube is caused protrude and the base end portion of the nanotube is fastened to a holder.

The present invention can be applied to sharpen the tip end portion of not only the nanotube product but also of a requested nanotube. In other words, if both ends of a nanotube is fastened to each of electrodes such as knife edge, etc. and an evaporation starting region is arranged at the central portion of the nanotube, the sharpening treatment of the nanotube can be carried out by means of flowing an electric current.

The present invention is not limited to the embodiments described above. Various modifications and design alternations, etc. that involve no departure from the technical concept of the present invention are also included in the technical scope of the present invention.

As seen from the above, according to the present invention, after the selection of a nanotube to be sharpen, the base end portion of the nanotube is first connected to an electrode with the tip end portion of the nanotube protruded from the electrode, next the protruding tip end portion of the nanotube is connected to another electrode, then an electric current is caused to flow in the middle portion of the nanotube by means of applying a voltage between the two electrodes, and then the constituent atoms of the nanotube are caused to evaporate layer by layer from a evaporation starting region, which is in the middle region, by the heat generated by the electric current so that the diameter of the evaporation starting region is reduced, and finally the tip end portion of the nanotube is sharpened by cutting the evaporation starting region in a taper shape.

The diameter of the tip end which is sharpened is the section diameter of a most inside layer, which is sharpened up to a precision of 1 nm or less. Moreover, though the tip end is sharpened to be fine, other regions of the nanotube is of multiple layer, and thus the nanotube possesses rigidity as a multiple layer nanotube.

Furthermore, according to the present invention, a nanotube product which is improved remarkably in operation precision can be produced by way of sharpening the tip end of a nanotube before a nanotube product is completed, and then a nanotube for which the sharpening treatment is made is installed in the nanotube product.

Moreover, the diameter of the sharpened nanotube tip end is the same as the diameter of the most inside layer of the nanotube, so that a nanotube that possesses not only rigidity same as a multiple layer nanotube but also a tip precision (the degree of sharpness of a tip end) same as a single layer nanotube can be obtained. The diameter of the sharpened tip end becomes the section diameter of the extreme inside layer, and the nanotube can be sharply processed up to the precision of 1 nm or less. Further, the tip end portion possesses the rigidity like the multiple layer nanotube even the tip end portion is sharpened, since other regions of the nanotube have multiple layers.

By sharpening the tip end of a nanotube chosen individually before composing a nanotube product, such a sharpened nanotube is provided to the market. Moreover, in the nanotube product provided with the sharpened nanotube fastened to a holder thereof, the operation precision of the sharp tip end is improved remarkably. Accordingly, a nanotube product which has a super-high resolution and functions as a nano-robot can be provided to the market.

Furthermore, according to the present invention, a nanotube product in which the base end portion of a nanotube is fastened to the holder and the tip end portion of the nanotube is protruded from the holder is manufactured in advance, and then the nanotube protruding from the holder is sharpened. In other words, the sharpening process of the nanotube is curried out at the same time as the manufacturing of a nanotube product, and the sharpening treatment is also curried out after a nanotube product is competed. Accordingly, the connection of a nanotube to an electrode and the fastening of the nanotube can be done more easily than on an isolated nanotube. Also, a nanotube product having high strength and super-high resolution power can be provided, since the tip end is sharpened up to 1 nm or less and moreover other regions of the sharpened nanotube have the same rigidity as a multiple layer nanotube.

In the present invention, the temperature of the central portion of the nanotube can be set higher than temperatures at both ends of the nanotube by way of using both end portions of the nanotube as heat absorption openings, and the central portion is set in the middle portion of the nanotube, thus allowing the central portion to be used as the evaporation starting region of the nanotube. Accordingly, the central portion of the nanotube can be sharpened without considering the evaporation starting region at all.

Furthermore, in the present invention, a defect made on the surface or the inside of a nanotube during the production of a nanotube is detected by an electric microscope, etc., and the nanotube is arranged so that the defect is located in the middle portion of the nanotube. Using the property that the defect portion possesses high electric resistance, the defect is used as the evaporation starting region of the nanotube, thus sharpening the nanotube. Accordingly, the sharpening treatment can be curried out considerably easily, since the defect, etc. which the nanotube originally has are used as the evaporation starting region.

In the present invention, the evaporation starting region can be artificially formed at a desired position in the middle portion of a nanotube. The artificially formed evaporation starting region is high in electric resistance. Accordingly, using the property that the evaporation starting region made artificially has high electric resistance, constituent atoms in the nanotube are evaporated from this artificially formed evaporation starting region, thus sharpening the tip end of the nanotube. In this case, the evaporation region is formed artificially, and thus steps for sharpening treatment increases. However, there is an advantage that the nanotube can be sharpened, even in the case where any defect, etc. cannot be found in the nanotube at all.

Furthermore, in the present invention, a defect can be artificially formed at a desired position in a middle portion of the nanotube by means of a mechanical operation or a particle beam irradiation. The artificially formed defect is high in electric resistance. Accordingly, using the property that the defect portion has high electric resistance, constituent atoms in the nanotube are evaporated from this artificially formed defect portion, thus sharpening the tip end of the nanotube. It is an advantage of this method that particle beam irradiation such as an electron beam or an ion beam, etc. is easily performed in order to form the defect by an existent electron microscope or an existent ion beam apparatus.

In the present invention, the middle portion of the nanotube can be curved by an external force. The maximally curved portion of the middle portion is high in electric resistance; and using the property that the maximally curved portion has high electric resistance, constituent atoms in the nanotube are evaporated from this maximally curved portion, thus sharpening the tip end of the nanotube. Since a beam is not used at all, the preservation and the management of the sharpening apparatus are easy; and moreover, since the maximally curved portion can be easily formed, the sharpening treatment can be curried out speedily and easily.

What is claimed is:

1. A sharpening method of nanotubes, comprising the steps of:

connecting a base end portion of a nanotube to an electrode with a tip end portion of said nanotube protruded from said electrode;

connecting said tip end portion of said nanotube to another electrode;

applying a voltage between said electrodes so as to cause an electric current to flow in a middle portion of said nanotube which is located between said electrodes;

evaporating constituent atoms of said nanotube layer by layer from a evaporation starting region, which is located in said middle region, by heat generated by said electric current, thus reducing a diameter of said evaporation starting region; and cutting said evaporation starting region having a reduced diameter, thus forming a sharpened end on said nanotube.

2. A sharpening method of nanotubes used nanotube products in which a base end portion of a nanotube is connected to a holder with a tip end portion of said nanotube protruded from said holder, said method comprising the steps of:

connecting said tip end portion to an electrode, applying a voltage between both end portions of said nanotube so as to cause an electric current to flow in a middle portion of said nanotube which is located between said holder and said electrode;

evaporating constituent atoms of said nanotube layer by layer from a evaporation starting region, which is located in said middle region, by heat generated by said electric current, thus reducing a diameter of said evaporation starting region; and cutting said evaporation starting region having a reduced diameter, thus forming a sharpened end on said nanotube protruded from said holder.

3. The sharpening method of nanotubes according to claim 1 or 2, wherein:

temperature of a central portion of said nanotube is set higher than temperatures at both ends of said nanotube by way of using both end portions of said nanotube as heat absorption openings; and said central portion is set in said middle portion of said nanotube, thus allowing said central portion to be used as said evaporation starting region of said nanotube.

4. The sharpening method of nanotubes according to claim 1 or 2, further comprising the steps of:

detecting a defect which is made during production of said nanotube; and setting said nanotube so that said defect is located in said middle portion of said nanotube, thus allowing a position of said defect to be used as said evaporation starting region of said nanotube.

5. The sharpening method of nanotubes according to claim 1 or 2, further comprising the step of artificially forming said evaporation starting region at a desired potion in said middle portion of said nanotube, thus forming said sharpened end on said nanotube by way of using said evaporation starting region.

6. The sharpening method of nanotubes according to claim 5, further comprising the step of artificially forming a defect at a desired potion in said middle portion of said nanotube, thus using said defect as said evaporation starting region artificially formed.

7. The sharpening method of nanotubes according to claim 5, further comprising the step of causing said middle portion of said nanotube to be curved by an external force, thus using a maximally curved portion of said middle portion as said evaporation starting region artificially formed.

* * * * *